United States Patent [19]
Beckmann

[11] 4,124,269
[45] Nov. 7, 1978

[54] SCANNING SYSTEM WITH IMPROVED RADIATION ENERGY COLLECTING CAPABILITIES

[75] Inventor: Leo H. J. F. Beckmann, Delft, Netherlands

[73] Assignee: N.V. Optische Industrie "De Oude Delft", Delft, Netherlands

[21] Appl. No.: 766,957

[22] Filed: Feb. 9, 1977

Related U.S. Application Data

[63] Continuation-in-part of Ser. No. 652,722, Feb. 3, 1976, abandoned.

[30] Foreign Application Priority Data

Feb. 3, 1975 [NL] Netherlands .................. 7501243

[51] Int. Cl.² .............................................. G02B 27/17
[52] U.S. Cl. ................................................ 350/6.8
[58] Field of Search .................. 350/6, 7, 285, 171; 250/341, 236, 833; 356/28; 358/199

[56] References Cited

U.S. PATENT DOCUMENTS

| | | | |
|---|---|---|---|
| 3,211,046 | 10/1965 | Kennedy | 350/171 |
| 3,594,578 | 7/1971 | Ohman | 350/6 |
| 3,619,029 | 11/1971 | Crownover | 350/6 |

FOREIGN PATENT DOCUMENTS

1,201,964  8/1970  United Kingdom ...................... 350/298

*Primary Examiner*—John K. Corbin
*Assistant Examiner*—B. W. de los Reyes
*Attorney, Agent, or Firm*—Arthur B. Colvin

[57] ABSTRACT

A scanning system for use in an air-borne vehicle and adapted for collecting and focusing radiation received by periodically scanning a strip of the ground from which radiation energy is being collected extending tranversely to the course of flight, comprising a scanning mirror having at least three radiation reflective surfaces mounted in symmetric and parallel relationship relative to the axis of rotation of said scanning mirror. Each one of said radiation reflective surfaces during its active scan interval consecutively views a first optical system and a second optical system respectively. Said first optical system and said second optical system as well, each are adapted to collect and focus respectively radiation reflected from the respective one of said radiation reflective surfaces during its active scan interval onto a focal point within the entrance aperture of a radiation detector. An optical switch or light beam chopper which operates in synchronism with the rotating scanning mirror is effective to alternately direct the two separate beams focused by said first and second optical systems respectively on the radiation detector.

11 Claims, 20 Drawing Figures

SCANNING SYSTEM WITH IMPROVED RADIATION ENERGY COLLECTING CAPABILITIES

RELATED APPLICATIONS

This is a continuation-in-part application of the patent application for an "Optical Device for Collecting and Focusing Radiation from an Aircraft," Ser. No. 652,722, filed on Feb. 3, 1976 by Leo Heinrich Josef Franz Beckmann and now abandoned.

BACKGROUND OF THE INVENTION

This invention relates to a scanning system for use in an air-borne vehicle and adapted for collecting and focusing radiation received by periodically scanning a strip of ground from which radiation is being collected extending transversely to the course of flight.

One prior art system of this kind, for instance as described and claimed in U.S. Pat. No. 3,211,046, filed on Jan. 4, 1962 by Howard V. Kennedy, Dallas, Tex., assignor to Texas Instruments Incorporated, Dallas, Tex., a corporation of Delaware, and titled "Split Image High Scanning Rate Optical System with Constant Aperture" comprises a scanning mirror having at least three radiation reflective surfaces mounted in symmetric and parallel relationship relative to the axis of rotation of said scanning mirror. During each scan interval of said scanning mirror radiation emitted from the ground from which radiation is being collected is simultaneously reflected by two of said radiation reflective surfaces, which each view an associated one of two separate optical systems for collecting and focusing respectively the radiation reflected from the respective two of said radiation reflective surfaces onto a focal point within in the entrance aperture of a common radiation detector. When said scanning mirror rotates through an active scan interval the amount of radiation energy reflected from the respective two radiation reflective surfaces and supplied through its associated optical system to said detector varies in such a manner that the total amount of radiation simultaneously supplied by said two optical systems through a radiation recombining folding mirror to said detector remains constant during the respective scan interval. In other words the increase of radiant energy collected and focused by the one optical system equals the decrease of radiant energy collected and focused by the other optical system. Therefore, with this prior art system organization a so-called split image scanning system is provided wherein during each active scan interval the optical aperture remains constant.

One disadvantage of this prior art system is the fact that each of the parabolic mirror segments included in each of the aforesaid optical systems and towards which radiation energy is reflected from the respective radiation reflective surface of said scanning mirror will have to cover an angle sufficiently large to focus the total radiant energy on the folding mirror. Consequently the radiation detector not only receives valid radiation emitted from the ground and reflected by the respective radiation reflective surface of said scanning mirror, but also useless radiation originating for instance from the interior of the scanning system, such as for example the walls and/or a radiation reflective surface of the scanning mirror which is not participating in an active scan interval. In this connection it is to be observed that often it is desired to photographically record temperature differences in the order of 0.15° C and the temperature within the scanning system can be considerably higher than that of the ground emitting the radiation being collected; therefore this prior art system is highly sensitive to spurious radiation whereby the recordings are severely deteriorated. A further disadvantage of this prior art system is that although the principle of optical doubling is utilized and therefore a high scanning rate can be achieved, the number of active scans for each rotation of the scanning mirror through 360° is limited to the total number of radiation reflective surfaces of said scanning mirror.

Another prior art scanning system for collecting and focusing radiant energy is described and claimed in U.S. Pat. No. 3,487,224 filed on Dec. 22, 1967 by L. H. J. F. Beckmann, assignor to Optische Industrie N.V. "De Oude Delft," and titled "Scanner which utilizes a pair of time-shared apertures."

This prior art system which is referred to as a whole-image optical system comprises a scanning mirror having two or more radiation reflective surfaces each inclined at a 45° angle to the axis of rotation and rotated about said axis. Radiation energy emitted, impinging on one of said radiation reflective surfaces is reflected parallel to the axis of rotation towards two mirror segments disposed in side-by-side relation. These mirror segments which determine the beam angle, i.e., the angular width of a circle sector covered by the active beam of rays in the radiation reflective surfaces of said scanning mirror, separate from the received radiation two discrete beams which ultimately by means of an optical switch or light beam chopper which operates in synchronism with the scanning mirror rotation, are alternately supplied to a single radiation detector. One disadvantage of this prior art system is the fact that the diameter of the aforesaid two mirror segments is determined by the number of radiation reflective surfaces included in said scanning mirror. A further disadvantage is that the number of scans for each rotation of said scanning mirror through 360° is limited to the number of radiation reflective surfaces included in said scanning mirror.

SUMMARY OF THE INVENTION

The present invention exploits the advantages and eliminates substantially the disadvantages of the prior art optical scanning systems described above. More in particular it is an object of the present invention to improve the collecting capabilities of an optical scanning system for use in an air-borne vehicle, so as to provide a scanning system wherein each one of said radiation reflective surfaces when moving through its effective scan arc performs two consecutive scans of the ground from which radiation energy is being collected.

It is a further object of this invention to provide an optical scanning system wherein said two consecutive scans of the ground from which radiant energy is being collected are performed over the same scanned angle thereby increasing the number of scans per revolution of the scanning mirror through 360° to twice the number of reflective surfaces of the scanning mirror.

It is also an object of the invention to provide an optical scanning system wherein said two consecutive scans of the ground from which radiant energy is being collected are performed over two angulary adjacent scan angles, thereby increasing the total angularly coverage.

It is a further object of this invention to provide an optical scanning system wherein each one of said two separate optical systems for collecting and focusing radiant energy reflected from said scanning mirror, has a separate detector associated therewith so that discrete and different signals produced by the two separate detectors can be combined in a manner to derive additional useful information from the ground from which radiant energy is being collected.

An illustrative embodiment of a radiant energy scanning system according to the invention comprises an optical scanning mirror having at least three reflective surfaces extending in parallel to the longitudinal axis of said mirror; means for rotating said scanning mirror around said longitudinal axis; a radiant energy detector arrangement for converting radiant energy reflected from said scanning mirror into corresponding signals; said scanning mirror during a first portion of an active scan interval of a certain one of said reflective surfaces thereof being effective to reflect waves of radiant energy impinging on said certain one surface to a first radiant energy transferring means and during a second portion of said active scan interval following said first portion being effective to reflect waves of radiant energy impinging on said certain one surface to a second radiant energy transferring means spaced from said first transferring means; first optical means for focusing a first beam of waves of radiant energy from said first transfer means onto a first area within the entrance aperture of said radiant energy detector arrangement; second optical means for focusing a second beam of waves of radiant energy from said second transferring means onto a second area within the entrance aperture of said radiation energy detector arrangement; optical switch means synchronously coupled to said scanning mirror for alternately allowing said first beam and said second beam respectively to impinge on said radiation energy detector arrangement.

In accordance with a further aspect of the present invention said scanning mirror is dimensioned and disposed relative to said first and second transferring means for permitting said certain one reflective surface to consecutively scan over the same scan angle during said active scan interval. In accordance with a further aspect of this invention the detector arrangement comprises two separate detector units, one detector unit being sensitive to a first kind of radiation and the second detector unit being sensitive to a different kind of radiation, wherein said optical switch means are effective to alternately allow said first beam and said second beam respectively to impinge on said first detector unit and said second detector unit respectively.

BRIEF DESCRIPTION OF THE DRAWINGS

FIG. 5b shows a sectional view along line Vb—Vb in FIG. 5a;

FIG. 6b shows a cross-sectional view along line VIb—VIb in FIG. 6a; and

FIG. 6c shows a side-view of the embodiment of FIG. 6a.

DETAILED DESCRIPTION OF THE DRAWINGS

Before elucidating the subject invention by reference to a detailed description and drawings it is observed that in an optical scanning system to which the subject invention relates for the slow scanning movement use is made of the forward movement of the air-borne vehicle carrying the optical scanning system. It is only the fast scanning movement (line scanning) that is performed by the optical scanning system. The choice of the number of radiation reflective surfaces of the rotatable scanning mirror is determined by the requirements set to the scanning system, such as the scan angle (i.e., the angle over which viewed from the air-borne vehicle, the ground from which emitted radiation is being collected is scanned transversely to the course of flight), the scan rate (i.e., the number of scans per minute), the permissible number of revolutions of the rotatable scanning mirror, the band-width of the electric signal to which the radiation received by the detector arrangement is converted, the signal-to-noise ratio, etc.

Figure 1A:
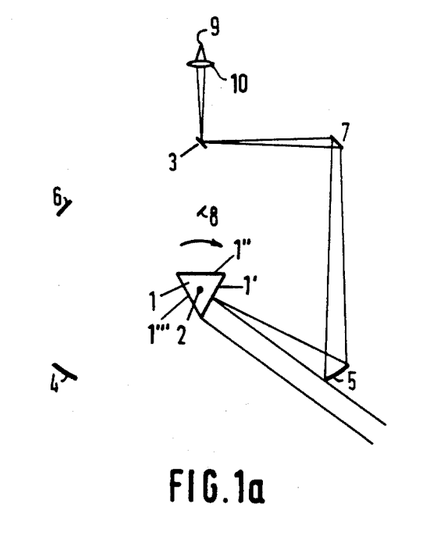
FIGS. 1a–d show in a schematic form a first embodiment of an optical scanning system based on the principle of the present invention, and having a single detector.
Figure 1B:
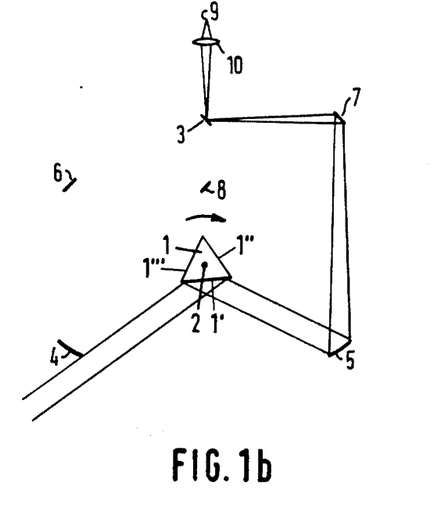
Figures 1C, 1D:
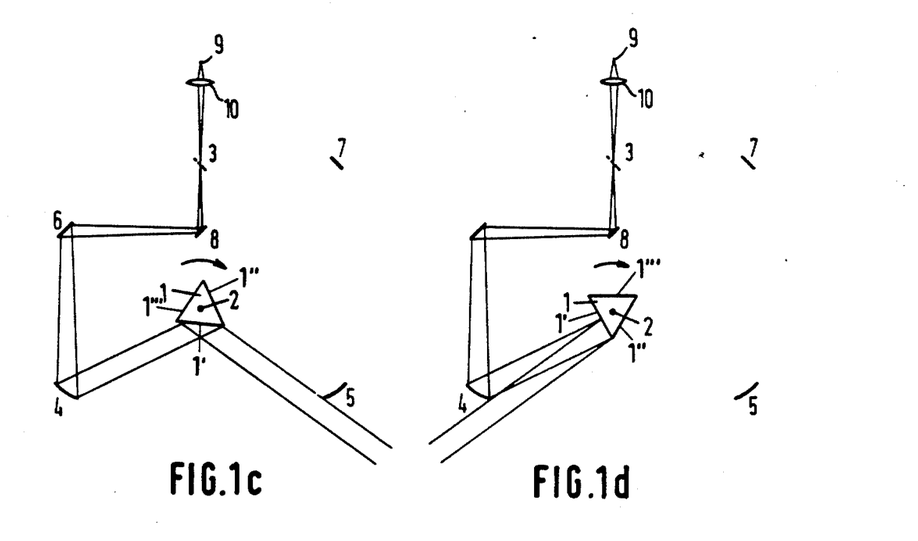

Now referring to FIG. 1a–d, which show a first embodiment of the optical scanning system of this invention, a detailed description of this embodiment follows. This embodiment comprises a rotatable scanning mirror 1 having three radiation reflective surfaces 1', 1" and 1'" extending in parallel to the longitudinal axis 2 of said scanning mirror. The three angularly adjacent reflective surfaces form a symmetric three-sided prism wherein the axis of rotation 2 coincides with the axis of symmetry. Starting from the position shown in FIG. 1a, wherein one of the three sharp edges of the scanning mirror 1 points downwardly the radiation reflective surface 1' is in its initial position of an active scan interval wherein radiation emitted from the ground is to be collected. In this position an incoming beam of radiant energy emitted from the ground is reflected to a first radiant energy transferring means, more in particular a mirror segment 5 which is included in a first optical system having a further mirror segment 7, for collecting and focusing the beam of radiant energy reflected from the scanning mirror 1 onto a focal point which is within the entrance aperture of a radiant energy detector 9. In the drawing the reference numeral 3 schematically shows an optical switch or light beam chopper of a type as described in the afore-mentioned U.S. Pat. No. 3,487,224. This optical switch 3 which is synchronously coupled to the scanning mirror 1 in the position shown in FIGS. 1a and 1b is effective to solely reflect radiant energy emanating from the afore-mentioned first optical system to the detector arrangement 9 through a lens system 10 while shutting off said detector for radiation energy emanating from other sources. Drive means (not shown) are effective to rotate the scanning mirror 1 in a clockwise direction indicated by the arrow until the position is reached as shown in FIG. 1b. When having reached this position radiation reflective surface 1' has moved through a first portion of its active scan interval during which first portion one line or strip of the ground has been scanned transversely to the course of flight of the airborne vehicle which carries the optical scanning system. When rotating beyond the position shown in FIG. 1b of the scanning mirror 1, the optical switch 3 is switched into a condition wherein solely radiation emanating from a second optical system including a second radiant energy transferring means, more in particular mirror segment 4, mirror segment 6 and mirror segment 8 is allowed to impinge on the radiant energy detector 9. In the position as shown in FIG. 1c the respective radiant reflective surface 1' is in its initial position of a second portion of its active scan interval during which the incoming beam of radiant energy emitted from the ground is reflected to the aforesaid second optical system which also is effective to collect and focus a beam of radiant energy onto a focal point within the entrance aperture of the radiant detector 9. When rotating from the position shown in FIG. 1c to the position shown in FIG. 1d the radiant reflective surface 1' under consideration scans a second line or strip of the ground during the second or last portion of its active scan interval. In the position shown in FIG. 1d the next sharp edge of the scanning mirror points downwardly and consequently after having rotated through an angle of 120° the starting position shown in FIG. 1a again is reached wherein the next radiant reflective surface 1" is in its initial position of its active scan interval. As has become apparent from the above description one radiant reflective surface of the scanning mirror 1 once having moved through a scan angle of 120° has performed two consecutive scans of the ground. Therefore, when the scanning mirror 1 rotates through 360° six lines or strips of ground will be scanned, in other words each reflective surface during its active scan interval scans two lines or strips of ground. In the embodiment shown in FIGS. 1a–1d the concave, collecting mirror segments 4 and 5 are disposed relative to the scanning mirror 1 so as to define the angular scan area which by these mirror segments actually is limited to be less than 120°. As will be apparent from FIGS. 1b and 1c during each active scan interval during a transition from the position shown in FIG. 1b to the position shown in FIG. 1c during each revolution of scanning prism 1 there is a "dead period" during which the detector 9 does not receive a useful signal. In practice this "dead period" amounts to 10° per active scan interval of the reflective surface of mirror 1 under consideration. Therefore with the embodiment shown in FIGS. 1a–1d during each rotation through 120° of scanning mirror 1, the same angle of 110° is scanned two times. It will be clear that with a given dimensioning of the scanning mirror 1 with its reflective surfaces, the dimensions of the optical elements included in the aforesaid two optical collecting and focusing systems can be chosen in such a manner that the effective apertures of these systems are equal to each other and are constant in time, with the result that the radiant detector will receive a constant amount of radiant energy from the ground during the effective scan interval portion in which the optical system effectively transfers radiant energy to the detector. In this arrangement of an optical scanning system the entrance aperture of the respective optical system is entirely filled with radiant energy emitted by the ground and reflected by the respective surface of the scanning mirror, without spurious radiation which does not originate from the ground, reaching the detector.

In principle the optical switch is a controllable two-state radiation transferring means which in synchronism with the scanning mirror alternately blocks and transmits radiant energy incoming from one direction while alternately transmitting and blocking radiant energy incoming from another different direction. Such an optical switch is known in the art and is for instance described in the aforementioned U.S. Pat. No. 3,487,224. The aforementioned optical systems for collecting and focusing the radiant energy as reflected by the scanning mirror may be of any suitable type. As also has been set out in the aforementioned U.S. Pat. No. 3,487,224, it is optional to have the two focal points defined by the two optical systems spaced apart a distance which is small relative to the focal length of the systems, or have both focal points coincide in one and the same point lying in the plane of the surface described by the reflecting areas of the optical switch. As will be further discussed in detail in connection with the embodiment shown in FIGS. 4a–c both focal points defined by the two optical systems substantially coincide in one and the same point lying in the plane of the reflecting sectors of the optical switch which rotates in synchronism with the scanning mirror. However, in order to make the system less sensitive for minor irregularities in the reflecting surface of the optical switch it may be recommendable to admit a somewhat wider beam section by focusing the beams produced by said two optical systems onto different focal points lying symmetrically relative to the surface described by the reflecting areas of the optical switch. As described in the aforementioned U.S. Pat. No. 3,487,224 the optical switch can be a disc-like body having reflective and transmissive sectors alternately disposed along its circumference; said disc-like body is further arranged to rotate in synchronism with the scanning mirror, wherein the total number of sectors of said optical switch is twice the number of reflective surfaces of the scanning mirror.

Figure 2A:
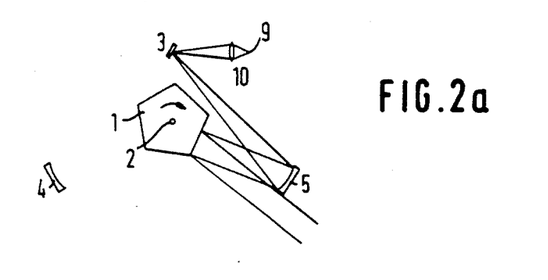
FIGS. 2a–d show in a schematic form a second embodiment of an optical scanning system based on the principle of the present invention, and also having a single detector.
Figure 2B:
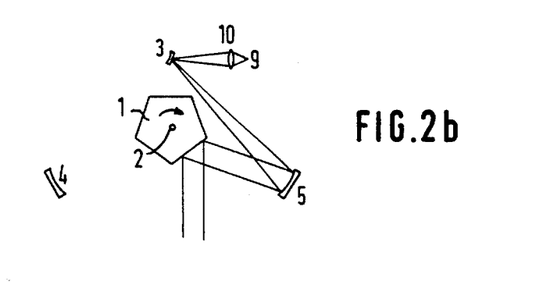
Figure 2C:
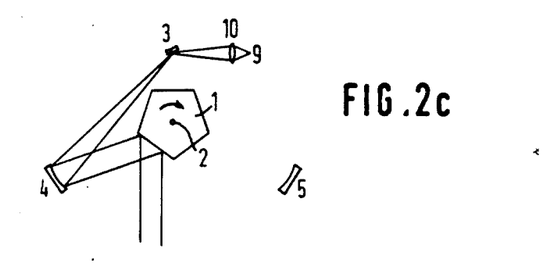
Figure 2D:
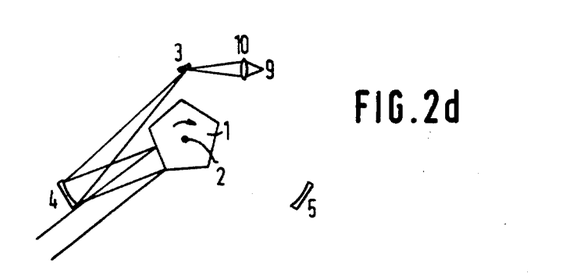

FIGS. 2a–d show a second embodiment of an optical scanning system according to the invention. With this second embodiment, which is similar to the first embodiment shown in FIGS. 1a–d in that a single radiant detector is employed which is in common for the two optical systems, during an active scan interval of one radiant energy reflective surface of the scanning mirror two angularly adjacent line segments of the ground are consecutively scanned and transferred through the two aforesaid optical systems. In the second embodiment shown in FIGS. 2a–d the rotatable scanning mirror 1 is a symmetric five-sided prism arranged to be rotated by drive means (not shown) around the axis of symmetry 2. The first and second radiant energy transferring means, i.e., the concave, collecting mirror segments 4 and 5, constitute in this second embodiment the optical system for collecting and focusing the radiant energy reflected by the scanning mirror onto focal points within the entrance aperture of the radiant energy detector 9. These mirror segments 4 and 5 are disposed relative to the scanning mirror 1 so that a beam of radiant energy reflected from the scanning mirror towards the mirror segment under consideration includes an angle of 18° to the horizontal. Starting from the position shown in FIG. 2a, in which a sharp edge of the scanning mirror 1 points substantially upward, only radiant energy emanating from the right-hand optical system including mirror segment 5 can reach the radiant energy detector 9 through the optical switch 3 and the lens system 10. In the position shown in FIGS. 2a and 2b the optical switch 3 is set in a state wherein the detector 9 is shut off for radiant energy incoming from other directions than the one as defined by the first optical system 5. When rotating in clockwise direction as indicated by the arrow the scanning mirror 1 reaches the position as shown in FIG. 2b in which a sharp edge of the scanning mirror points downwardly. At this moment the optical switch is switched into a state in which solely radiant energy emanating from the left-hand optical system including the mirror segment 4 can reach the detector, as shown in FIG. 2c. Upon further rotation of the scanning mirror 1 the scanning beam moves from the vertical position as shown in FIG. 2c to the left until the position shown in FIG. 2d is reached. As will be apparent from the FIGS. 2a-d, FIGS. 2a and 2b illustrate the situation wherein a first line or strip of ground is scanned corresponding with an angular area as defined by the two positions of the scanning beam in FIGS. 2a and 2b. FIGS. 2c and 2d are illustrative for the situation wherein an adjacent line or strip of ground is consecutively scanned and which second line corresponds to a second angular area as defined by the two positions of the scanning beam shown in these FIGS. 2c and 2d. During the transition of the position shown in FIG. 2b to the position shown in FIG. 2c there is also a "dead-period" in the active scan interval under consideration. In the embodiment shown in FIGS. 2a-d during a rotation of the scanning mirror through 72° two adjacent lines or strips of ground are consecutively scanned, so that after completion of one revolution through 360°, 10 scans are performed which, however, in this embodiment manifest themselves as the right-hand and left-hand halves of five scanning lines.

Figure 3A:
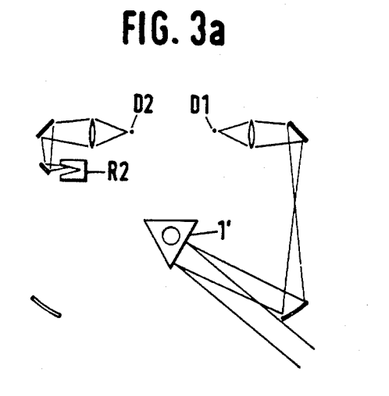
FIGS. 3a–d show in a schematic form a third embodiment of an optical scanning system based on the principle of the present invention, and having two separate detector units.
Figure 3B:
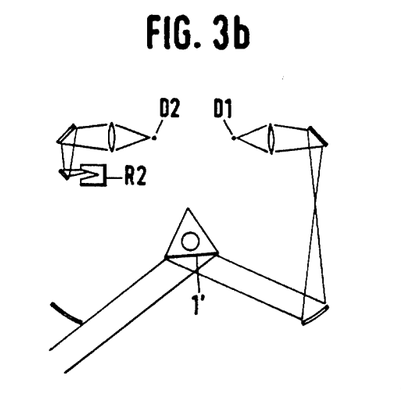
Figure 3C:
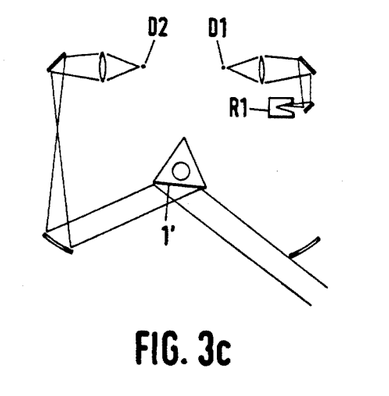
Figure 3D:
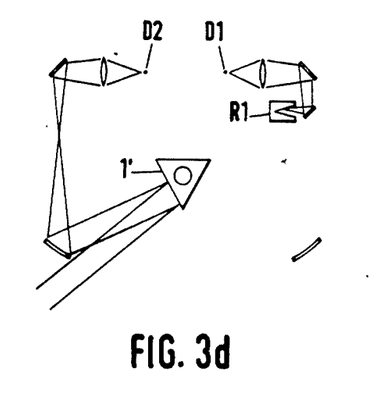

FIGS. 3a-d show an alternative embodiment of an optical scanning system of the present invention, and wherein two separate detector units are employed. The structural organization and operation are similar to the organization and operation as described in the foregoing in connection with FIGS. 1a-d. Therefore, similar components have the same reference numerals. However, instead of having one detector which is used in common by the two of said optical systems, in the embodiment of FIGS. 3a-d, each one of said two optical systems has its individual detector unit D1 and D2 respectively associated therewith. In an advantageous embodiment the first detector unit such as D1 is sensitive to a first kind of radiant energy, while the second detector unit D2 is sensitive to a second different kind of radiant energy. Further each detector unit has an individual reference source R1 and R2 respectively associated therewith for calibration purposes. As will be apparent to a person skilled in the art, the radiation emitted by the respective reference source is of the same kind as the kind of radiation for which its associated detector unit is sensitive. As will become clear from FIGS. 3a-d, the structural organization of this embodiment is such that when one detector unit, such as D1, "looks at" the ground through its associated optical system and the respective "active" reflective surface 1' (FIGS. 3a, b), the other detector unit such as D2 "looks at" its associated reference source R2. As shown in FIGS. 3c, d, this situation is reversed when the respective active surface 1' of scanning mirror cooperates with the second optical system. Because the radiation sensitive detectors, in principle are not suitable for an absolute radiation measurement, reference radiation having predetermined characteristics is caused to impinge on the respective detector unit during its nonactive interval (i.e., when not looking at the ground). It is optional to employ detector units which are sensitive to different kinds of radiation, or detector units which respond to the same kind of radiation. In the first case from the two electric signals produced by said two detector units further useful information of the ground being scanned can be derived. It is a further advantage that two different reference sources then can be used.

Figure 4A:
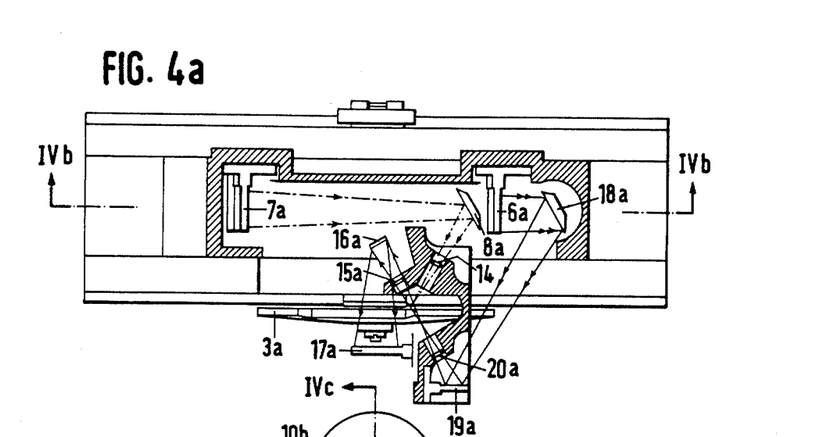
FIG. 4a shows a sectional view along line IVa—IVa in FIG. 4b, of a more detailed version of the first embodiment.
Figure 4B:
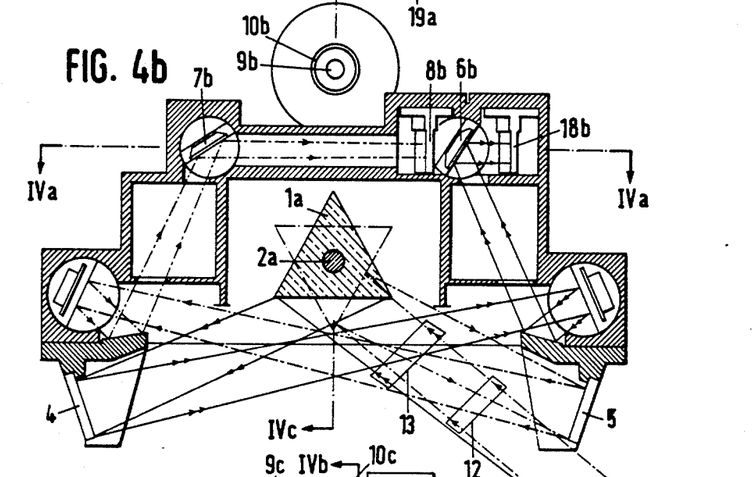
FIG. 4b shows a cross-sectional view along line IVb—IVb in FIG. 4a and line IVb—IVb in FIG. 4c.
Figure 4C:
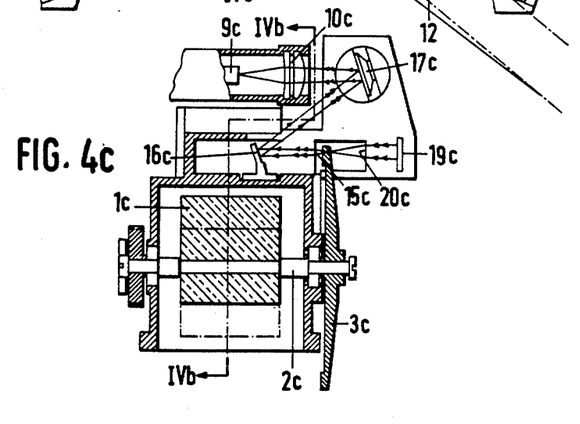
FIG. 4c shows a cross-sectional view along line IVc—IVc in FIG. 4b.
Figure 5A:
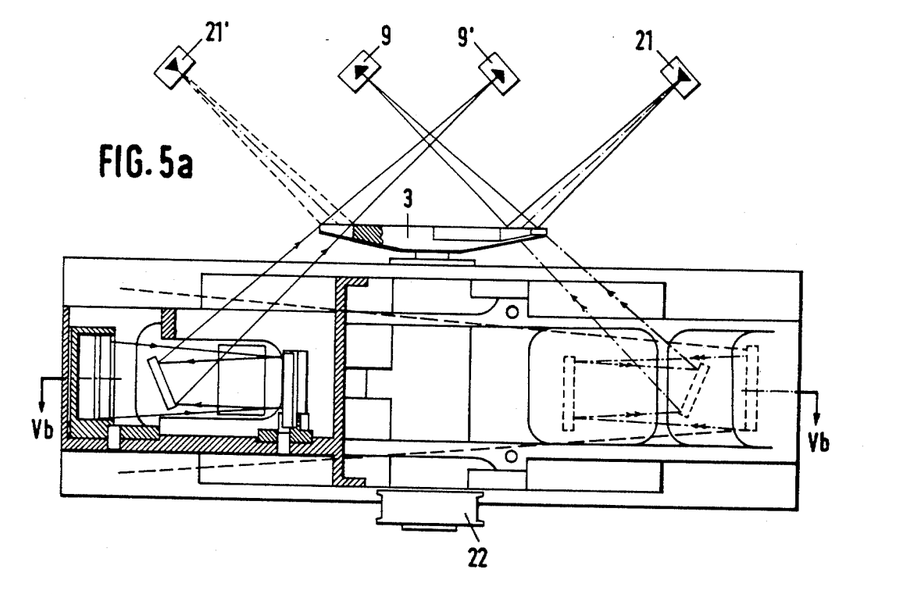
FIG. 5a shows a sectional view along line Va—Va in FIG. 5b of a more detailed version of the third embodiment.
Figure 5B:
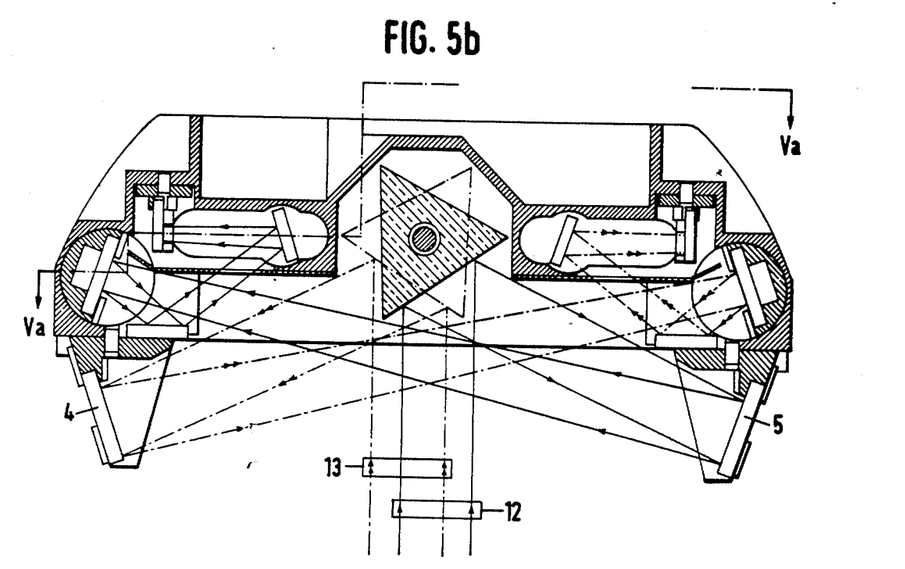

FIGS. 4a-c show more in detail an embodiment of an optical scanning system of this invention based on the first embodiment as schematically shown in FIGS. 1a-d. In the embodiment shown in FIGS. 4a-c components having the same function as the similar components of the embodiment shown in FIGS. 1a-d, have the same reference numerals. Therefore, in FIGS. 4a-c the three-sided scanning mirror is indicated by 1, and its axis of rotation is indicated by 2. The optical switch, which is fixedly mounted on the axis 2, is indicated by 3. (FIGS. 4a and 4c). The mirror segments for directly receiving the radiant energy as reflected from the scanning mirror are indicated by 4 and 5 respectively. The associated mirror segments of the respective optical system have the reference numerals 6 and 7 respectively. In this connection it is pointed out that components which in FIGS. 4a-c are the same have a letter added corresponding to the associated figure. For instance, mirror segment 6 in FIG. 4a has the reference numeral 6a while that same component in FIG. 4b has the reference numeral 6b. The common radiant energy detector is indicated by 9b and 9c and its associated lens system is indicated by 10b and 10c. It is further shown that a beam 12 (rays marked by one arrow) of radiant energy emitted from the ground and which beam 12 after being reflected by the scanning mirror 1 (when in a position as shown by dash-dot-lines) is transferred via mirror segment 5 and via mirror segment 7 (a and b), by means of an auxiliary lens 14 is focused on the plane described by the reflective surfaces disposed along the circumference of the disc-like body of the optical switch 3 (a and c). When beam 12 is processed the optical switch then presents a reflective surface so that as shown in FIGS. 4a and 4c beam 12 through another auxiliary lens 15 (a) and mirror segments 16 and 17 can reach the detector 9. In a similar manner a beam such as 13 (rays marked by two consecutive arrows) reflected from scanning mirror 1 (when in a position as shown by full lines) to the mirror segment 4, via mirror segment 6 (a and b) and mirror segment 18 and an auxiliary lens 19 is also focused in the plane as described by the disc-like body of the optical switch 3. However, when the optical system including the mirror segments 4 and 6 is active the optical switch then presents a radiant energy transmissive portion along its periphery so that the beam 13 via the mirror segments 18 and 19 and through the auxiliary lenses 20 and 15 and then via mirror segment 17 also can reach the common detector 9. Thus the optical switch in synchronism with the rotation of scanning mirror 1 alternately presents a radiant energy reflective and a radiant energy transmissive portion so that beams 12 and 13 alternately can reach the common radiant energy detector 9 through lens 10. FIGS. 5a and 5b show more in detail an embodiment based on the third embodiment shown in FIGS. 3a–d with two separate detector units 9 and 9' (see in particular FIG. 5a). The same reference numerals are employed in FIGS. 5a and 5b for similar components. With the embodiment shown in FIGS. 5a and 5b it is possible to employ two different detector units so that for instance detector unit 9 is sensitive to a first kind of radiant energy, for instance in the infrared region, while detector unit 9' is sensitive for another kind of radiant energy. By combining the two electrical signals produced by the two separate detector units further useful information from the radiant energy emitted from the ground can be derived. In the embodiment shown in FIGS. 5a and 5b each detector unit has associated therewith its own reference source 21 and 21' respectively. Each of the reference sources 21 and 21' produces radiant energy corresponding to the kind of energy for which its associated detector unit is sensitive. Now the arrangement is such that when the optical switch is blocking a beam of radiant energy emanating from one of the two optical systems the detector unit associated with the beam of radiant energy which is then blocked receives via a reflective portion of the optical switch radiant energy emitted from its associated reference source. This is shown schematically in FIG. 5a wherein it is shown that detector unit 9' receives a beam 12 of radiant energy emanating from the right-hand mirror segment 5 (FIG. 5b), while detector unit 9 by reflection via the corresponding reflective portion of the optical switch 3 then receives radiant energy from its associated reference source 21. It is obvious that by means of a pully 22 the scanning mirror and the optical switch can be rotated by drive-means not shown.

Figure 6A:
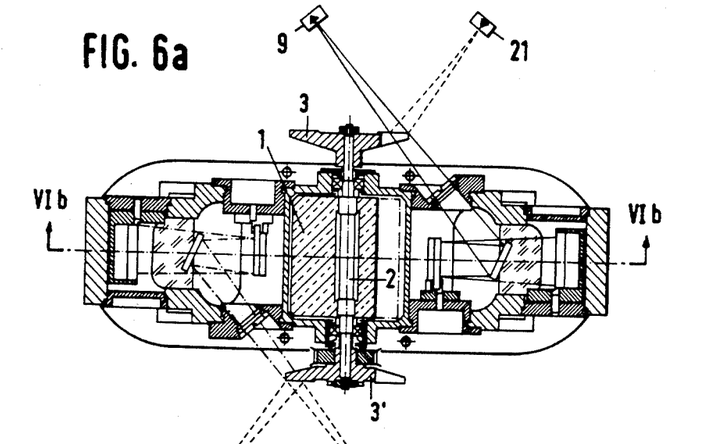
FIG. 6a shows a sectional view along line VIa—VIa in FIG. 6b of an alternative embodiment shown in greater detail, of the basic embodiment depicted in FIGS. 3a–d.
Figure 6B:
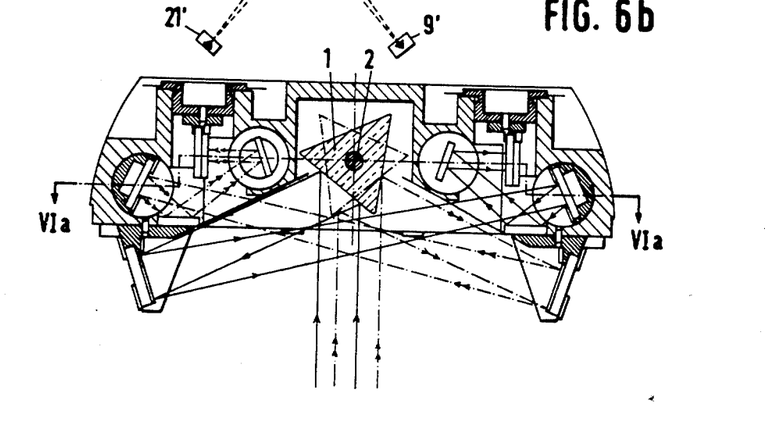
Figure 6C:
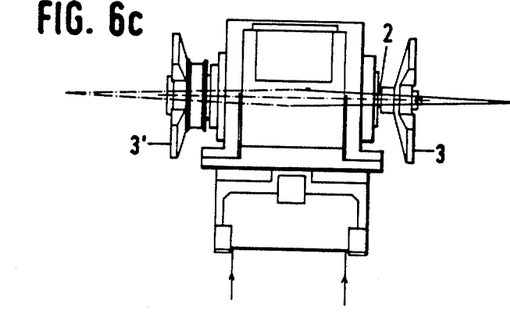

FIGS. 6a–c show a further embodiment which is similar to the embodiment shown in FIGS. 5a and 5b. However, in the embodiment of FIGS. 6a–c use is made of two optical switches 3 and 3' which are mounted on the opposite ends of the axis of rotation 2 for carrying the scanning mirror 1. Contrary to the embodiment of FIGS. 5a and 5b in the embodiment shown in FIGS. 6a–c the separate detector units 9 and 9' with their associated reference sources 1 and 1' are disposed on opposite sides of the housing including the optical scanning system.

The above disclosure points out the preferred embodiments of the subject invention; it is apparent that many modifications may be made thereto without departing from the spirit and scope of the invention, which is limited only as defined in the appended claims.

I claim:

1. A radiant energy scanning system for scanning an area disposed to one side of said system comprising an optical scanning mirror having at least three reflective surfaces extending parallel to the longitudinal axis of said mirror, means for rotating said scanning mirror around said longitudinal axis through scanning intervals during which said surfaces are sequentially directed toward and receive impinging radiant energy from said scanned area, a radiant energy detector arrangement for converting radiant energy reflected from said scanning mirror into corresponding signals, an optical system for establishing two separate optical paths to said detector arrangement including two receiving means operatively positioned relative to the scanning mirror for sequentially directing the radiant energy reflected from said surfaces during a single scanning interval along said two optical paths, the radiant energy from said entire area scanned impinging upon one of said surfaces being reflected substantially solely to one of said receiving means during a first half of said scanning interval, and onto the other of said receiving means during the second and consecutive half of the same scanning interval, first optical means for collecting and focusing a first beam of rays of radiant energy received via one of said receiving means within said radiant energy detector arrangement, a second optical means for collecting and focusing a second beam of rays of radiant energy received via said other of the receiving means within said radiant detector arrangement, and optical switch means synchronously coupled to said scanning mirror for alternately allowing said first beam and said second beam, respectively, to impinge on said radiant energy detector arrangement.

2. A radiant energy scanning system in accordance to claim 1, wherein said scanning mirror is dimensioned and disposed relative to said receiving means respectively for permitting said certain one reflective surface to consecutively scan over the same scanning angle during said active scan interval.

3. A radiant energy scanning system in accordance to claim 1, wherein said scanning mirror is dimensioned and disposed relative to said receiving means for permitting said certain one reflective surface to consecutively scan over two angularly adjacent scan areas during said active scan interval.

4. A radiant energy scanning system for scanning an area comprising an optical scanning mirror having at least three reflective surfaces extending in parallel to the longitudinal axis of said mirror, means for rotating said scanning mirror around said longitudinal axis progressively to advance each said surface through a scanning interval wherein the inclination of said surface is shifted from one to the other side of a line extending between said axis and said area, a composed radiant energy detector arrangement for converting the radiant energy from the scanned area impinging on said scanning mirror into corresponding signals, an optical system for establishing two separate optical paths between said scanning mirror and said composed radiant energy detector arrangement including means operatively positioned relative to said scanning mirror for sequentially directing said radiant energy impinging on each of said surfaces of the scanning mirror along each of said two optical paths during said scanning interval said radiant energy from said entire scanned area being substantially and solely reflected from one of the reflective surfaces during a first half of the scanning interval, while during the second and consecutive half of said scanning interval radiant energy impinging on that same one reflective surface being substantially and solely reflected first optical means for collecting and focusing a first beam of rays of radiant energy received from one of the optical paths within a first detector unit included in said composed detector arrangement, and second optical means for collecting and focusing a second beam of rays of radiant energy received from the other of the two optical paths within a second and separate detector unit included in said composed detector arrangement, and optical switch means synchronously coupled to said scanning mirror for alternately allowing said first beam and said second beam respectively to impinge on said first detector unit and said second detector unit respectively.

5. A radiant energy scanning system in accordance to claim 4, wherein said first detector unit is sensitive to a first kind of radiant energy and said second detector unit is sensitive to another kind different from said first kind, of energy.

6. A radiant energy scanning system in accordance to claim 5, wherein said scanning mirror is dimensioned and disposed relative to said first and second transferring means respectively for permitting said certain one reflective surface to consecutively scan over the same scanning angle during said active scan interval.

7. A radiant energy scanning system in accordance to claim 5, wherein said scanning mirror is dimensioned and disposed relative to said first and second transferring means respectively for permitting said certain one reflective surface to consecutively scan over two angularly adjacent scanning areas during said active scan interval.

8. A radiant energy scanning system in accordance with claim 4, wherein said scanning mirror is dimensioned and disposed relative to said first and second transferring means respectively for permitting said certain one reflective surface to consecutively scan over the same scanning angle during said active scan interval.

9. A radiant energy scanning system in accordance to claim 4, wherein said scanning mirror is dimensioned and disposed relative to said first and second transferring means respectively for permitting said certain one reflective surface to consecutively scan over two angularly adjacent scanning areas during said active scan interval.

10. A radiant energy scanning system in accordance to claim 4, wherein said optical switch means comprises two separate disc-like bodies fixedly connected to the opposite ends of the shaft carrying the rotatable scanning mirror wherein said first optical system is adapted to cooperate with one of said disc-like bodies while that second optical system is adapted to cooperate with the other one of said disc-like bodies.

11. A radiant energy scanning system in accordance to claim 4, wherein each one of said separate detector units has its own reference source of radiant energy associated therewith, wherein each reference source is adapted to view its associated detector unit when the other detector unit is receiving radiant energy emitted from the ground.

* * * * *